United States Patent [19]
Woodfield et al.

[11] Patent Number: 5,905,523
[45] Date of Patent: May 18, 1999

[54] INTERACTIVE SYSTEM

[75] Inventors: David Alan Woodfield, Walsall; David Robert Weston, London; Janko Mrsic-Flogel, London; Peter James Pfanner, London; Jeffrey Arnold Hollington, London; Peter Emrys-Roberts, London; David Neil Laurence Levy, London, all of United Kingdom

[73] Assignee: Two Way TV Limited, United Kingdom

[21] Appl. No.: 08/672,591

[22] Filed: Jun. 28, 1996

Related U.S. Application Data

[63] Continuation of application No. 08/323,236, Oct. 14, 1994.

[30] Foreign Application Priority Data

Oct. 15, 1993 [GB] United Kingdom .................. 9321312

[51] Int. Cl.$^6$ ...................................................... H04N 7/10
[52] U.S. Cl. ................................. 348/12; 348/13; 463/40
[58] Field of Search ........................ 463/40–42; 455/3.1, 455/3.2; 348/12, 13, 7, 469, 553, 552, 473

[56] References Cited

U.S. PATENT DOCUMENTS

| | | |
|---|---|---|
| 4,034,990 | 7/1977 | Baer . |
| 4,126,851 | 11/1978 | Okor . |
| 4,305,137 | 12/1981 | Best ........................................ 348/13 |
| 4,467,424 | 8/1984 | Hedges et al. . |
| 4,572,509 | 2/1986 | Sitrick . |
| 4,587,510 | 5/1986 | Kim . |
| 4,592,546 | 6/1986 | Fascenda et al. ........................ 463/40 |
| 4,623,920 | 11/1986 | Dufusne et al. . |
| 4,719,455 | 1/1988 | Louis . |
| 4,745,468 | 5/1988 | Von Kohorn ............................ 348/13 |
| 4,864,272 | 9/1989 | Cecchi et al. . |
| 5,073,931 | 12/1991 | Endebert et al. . |
| 5,083,271 | 1/1992 | Thacher et al. . |
| 5,151,782 | 9/1992 | Ferraro . |
| 5,236,100 | 8/1993 | Thompson, Jr. . |
| 5,236,199 | 8/1993 | Thompson, Jr. ........................ 463/40 |
| 5,324,035 | 6/1994 | Morris et al. . |
| 5,455,619 | 10/1995 | Lueckenmiller et al. . |
| 5,510,828 | 4/1996 | Lutterbach et al. ..................... 348/13 |
| 5,518,253 | 5/1996 | Pocock et al. ........................... 463/40 |

FOREIGN PATENT DOCUMENTS

| | | |
|---|---|---|
| 0 310 368 A2 | 4/1989 | European Pat. Off. . |
| 0 405 776 A3 | 1/1991 | European Pat. Off. . |
| 219 971 | 6/1988 | United Kingdom . |
| WO 89/06405 | 7/1989 | WIPO . |
| WO 91/08810 | 6/1991 | WIPO . |

*Primary Examiner*—Victor R. Kostak
*Attorney, Agent, or Firm*—Fattibene & Fattibene; Paul A. Fattibene; Arthur T. Fattibene

[57] ABSTRACT

An interactive system, comprising a local controller (8) operable to control data flow to and from at least two local handsets (11,22) for generating data. The local controller (8) includes a memory (28) for storing data and a processor. A central controller (1) is connectable to the local controller, and a display (12) is provided for displaying data locally from the central controller and the local controller. The local controller (8) stores data generated by each local handset and selectively transfers stored data to the central controller (1). A handset for use in the system comprises a transmitter and a receiver (9) for transfer of data between the handset (11,22) and the local controller and input means to input data for controlling the output of the display via the local controller is input to the local controller by means of a cursor control (33) laterally movable over a plane (36) and a sensor (38,41) for sensing a position of the cursor control within the plane (36) and causing a cursor on the display (12) to take up a similar position. A method of operating the system comprises broadcasting first data from the central controller to which the local controller responds by causing the display to display the broadcast first data. Second data from each local handset relating to the first data is stored in the local controller and then selectively transferred to the central controller if predetermined conditions are satisfied.

25 Claims, 4 Drawing Sheets

INTERACTIVE SYSTEM

RELATED APPLICATION

This application is a continuation application of application Ser. No. 08/323,236 filed Oct. 14, 1994.

FIELD OF THE INVENTION

This invention relates to an interactive system, in particular for use with mass media broadcasts.

DESCRIPTION OF THE PRIOR ART

Interactive systems are known, for example in a game playing system where a large number of users at different remote positions enter predictions relating to a mass media broadcast, e.g. scores or future moves in a football game, by way of a temporary connection along a telecommunication line to a central controller. A lock-out function is provided to prevent the user entering a prediction after the time of occurrence has passed for the predicted event. The temporary connection is made as a confirmation of a correct prediction or total score, rather than transmitting every prediction to the central processor initially. In these known systems, each player needs their own telephone link and a control set which includes complex and expensive circuitry. Groups of players in the same location must each have a control set to participate.

A more sophisticated example is described in EP-A-0405776 (U.S. Pat. No. 5,083,800) in which a game is run on individual personal computers (PC) and a mass broadcast is used to alter the parameters of the game for multiple users PC's simultaneously. The user can send a score or result at the end of the game. However, this game involves the user in considerable outlay to obtain his own personal computer and related equipment.

WO91/08810 relates to a method of evaluating data to determine winners of the game by applying statistical analysis to define which results need to be read.

SUMMARY OF THE INVENTION

In accordance with one aspect of the present invention, an interactive system comprises a local controller operable to control data flow to and from at least two local handsets for generating data, the local controller including a memory for storing data and processing means; a central controller connectable to the local controller; and a display for displaying data locally from the central controller and the local controller, wherein the local controller stores data generated by each local handset and selectively transfers stored data to the central controller.

The system of the present invention enables several users to participate at the same remote location with a local controller and communication to a central controller host, with other remote users at a different location and also to operate the system locally.

Preferably, the processing means of the local controller addresses each local handset sequentially in accordance with a predetermined schedule to obtain data from that handset.

The predetermined schedule may poll each handset and immediately move onto the next handset if no response is obtained, but preferably the predetermined schedule requires each handset to be polled for an equal time period.

The local controller may be preprogrammed during manufacture or store data input locally, but preferably the local controller is adapted to store data supplied from the central controller.

A unique identifier by which each handset is addressed may be embedded in each handset during manufacture or allocated to each handset at the start of each use, but preferably a unique identifier is allocated during the first use of a handset within the system or thereafter.

The local controller and central controller may be connected, for example, via a telecommunication link, a data distribution network or by means of TV broadcast transmissions.

The central controller may provide video and text data via the telecommunication link, but preferably, the central controller broadcasts video and text data for reception by the local controller and for display on the display.

Preferably, the transfer of data between each handset and the local controller is via an infrared link. This allows users to position themselves around the room rather than being limited by fixed length cable, although wires operating to transfer data in parallel could be used or parallel transfer by modulating the infrared signal would allow all handsets to operate at the same time.

Typically, the local controller selectively transfers data to the central controller only if a predetermined transfer condition is met.

When used for game playing, the predetermined transfer condition may be that a particular time has not yet expired since the end of the game to transfer a score, or that an upper limit on the number of participants transferring their score has not yet been reached, but preferably it comprises the user's score exceeding a predetermined score value at the end of a game play period. Thus, only participants with a reasonable chance of winning go to the expense of registering their score over the telecommunication link.

Preferably, the processing means of the local controller only transmits data to the central controller in response to a command from the central controller.

Preferably, the command is broadcast by the central controller along with the video and text data.

Preferably, a second local controller operable to control data flow to and from respective second handsets is provided such that data may be transferred between the first and second local controllers via the central controller. This has the advantage that players at remote locations can compete directly, or shops can deal with customer's enquiries and orders remotely.

In accordance with a second aspect of the present invention, a handset for use in a system according to the first aspect of the invention comprises a transmitter and a receiver for transfer of data between the handset and the local controller; input means to input data for controlling the output of the display via the local controller; and means for sensing a position of a cursor on the display.

Preferably, the input means comprise a cursor control laterally movable over a plane; and the means for sensing a position of the cursor control within the plane cause the cursor on the display to take up a similar position.

Examples of how the cursor on the display can be controlled include using buttons on the handset or a flat puck type cursor control.

Preferably, the sensing means monitor a change in potential difference with a change in position of the cursor control.

The interactive system may comprise, for example, one of a game playing system, a purchase system and an information system.

In accordance with a third aspect of the present invention, a method of operating an interactive system according to the first aspect comprises broadcasting first data from the central controller whereby the local controller responds by causing the display to display the broadcast first data; storing second data in the local controller obtained from each local handset relating to the first data; and selectively transferring the stored second data to the central controller if predetermined conditions are satisfied.

Preferably, the first data comprises game playing information and the second data comprises data relating to the playing of the game.

Preferably, the predetermined conditions are supplied to the local controller by the central controller as part of the game playing information broadcast.

Typically, the predetermined conditions include a minimum score value, the local controller comparing each stored score with the minimum score value and only transferring a stored score to the central controller if the stored score is the same as or exceeds the minimum score value.

In one example, the central controller maintains a ranking order for units which have previously recorded scores and defines an upper portion of the ranking order from which units are chosen to transmit their scores.

Preferably, the central controller allows a first group of scores to be transmitted, then sets one or more further group sizes until the desired number of scores which comply with the predetermined condition is achieved.

BRIEF DESCRIPTION OF THE DRAWINGS

Examples of a system and a handset in accordance with the present invention will now be described with reference to the accompanying drawings, in which.

DESCRIPTION OF THE PREFERRED EMBODIMENTS

Figure 1:
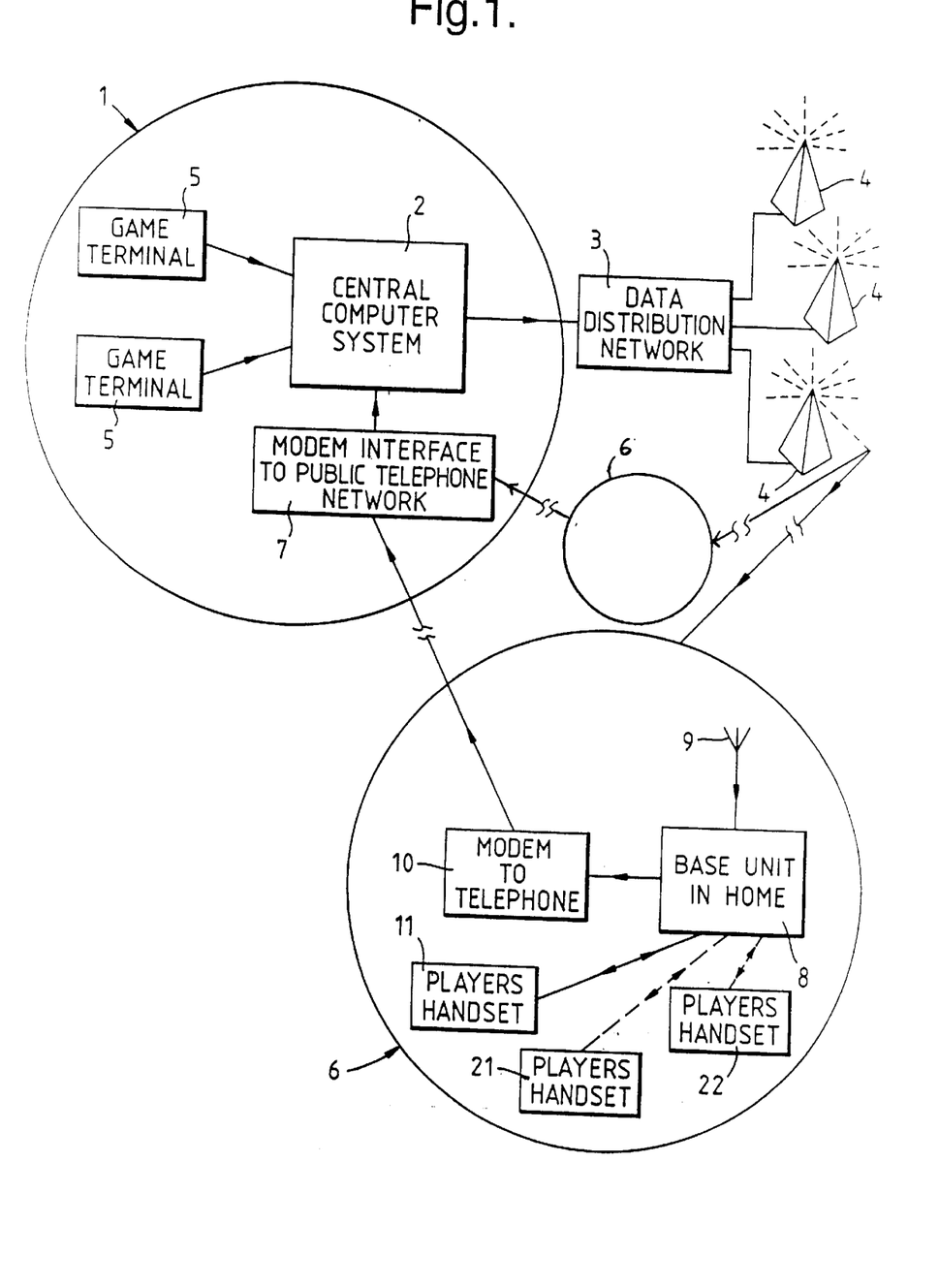
FIG. 1 illustrates the configuration of one example of the system.

An example of the system of the present invention when used in a game playing system is shown in FIG. 1. The system comprises a central controller 1 at a central location, for example a TV studio. This central controller comprises a computer system 2 which controls the broadcast of mass media broadcast over a data distribution network 3 and one or more transmitters 4. In an example where the central controller is operating in conjunction with a game show for TV broadcast, there may be one or more game terminals 5 connected to the computer system 2 for the game operators to operate. A modem 7 between the computer system 2 and the public telephone network (PTN) enables users at remote locations to transmit data to the central controller 1.

Remote local units 6 comprise a local controller 8, a receiving aerial or antenna 9 for receiving broadcasts from the transmitter 4 and a modem 10 to output data from the local controller 8 to the central controller 1 over the PTN. Two or more local handsets 11,21,22 are provided in conjunction with each local controller 8. Each remote local unit 6 has a local controller operable to control data flow to and from respective handsets, such that data may be transferred between local controllers via the central controller.

Figure 2:
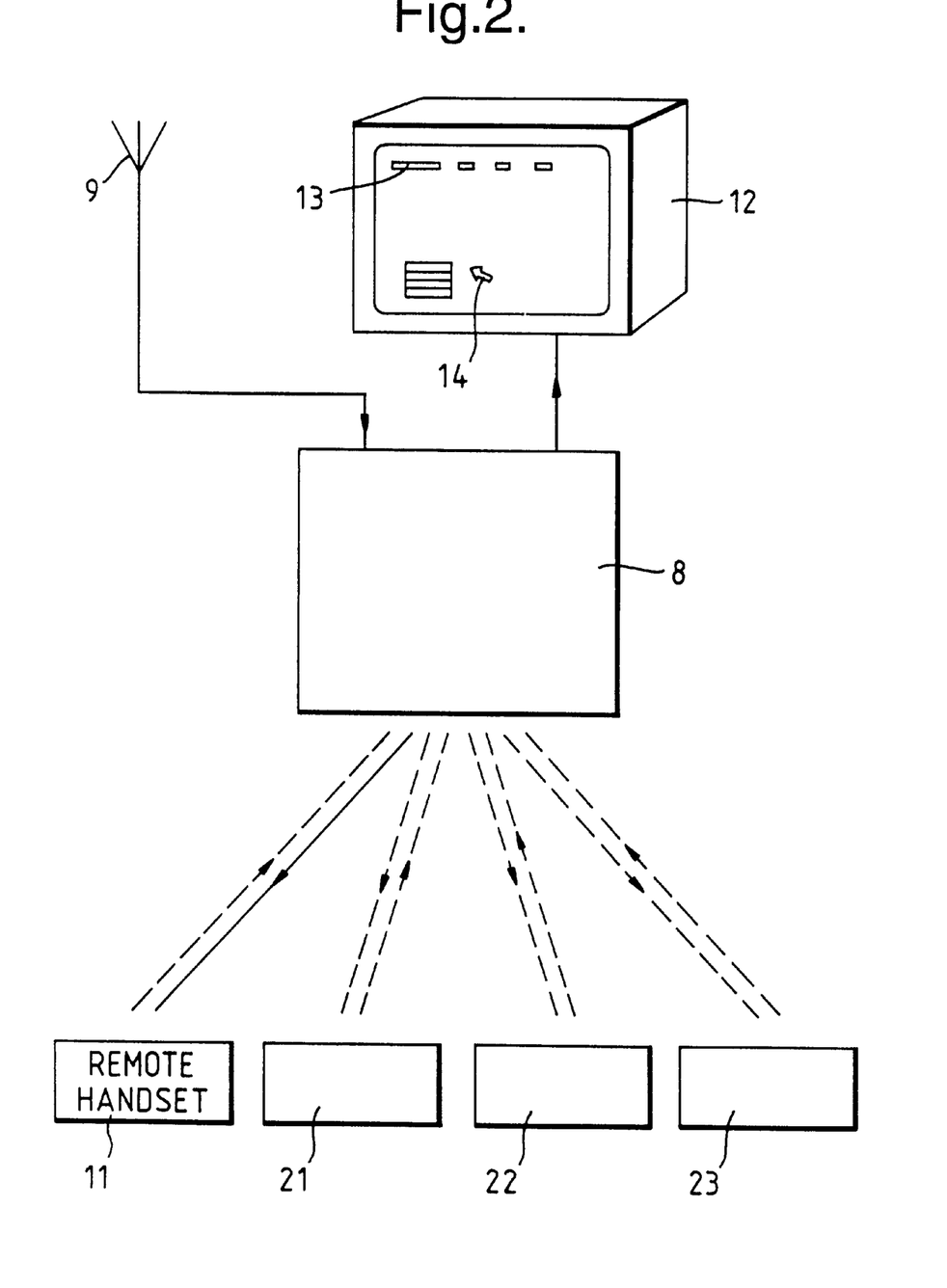
FIG. 2 illustrates a local unit for the system of FIG. 1.

The local unit 6 is shown in more detail in FIG. 2. As can be seen, the local controller 8 is connected to a monitor 12, such as a conventional television set. Broadcast information and programs from the central controller 1 are received by the aerial 9 and fed via the local controller 8 to the monitor 12 for display. For example, the broadcast could include a game program which is displayed in a conventional manner. In addition, the central controller transmits data for controlling operation of the local controller 8 and other information used by the local controller. This is received via the RF antenna 9 and stored in an updatable memory, e.g. flash ROM 35. Datacast transmissions from the central controller appear on the top few lines 13 of the display. In another example (not shown), the broadcast information could be supplied by a dedicated data broadcast channel or multiplexed with a cable channel.

The local controller 8 is connected to four remote handsets 11,21–23 each of which is operated by an individual player. The local controller 8 causes at least one cursor 14 to be displayed on the monitor 12, the position of the cursor being controllable by a selected one of the handsets 11,21–23. In some examples, four cursors could be displayed, one for each handset.

Figures 3, 4:
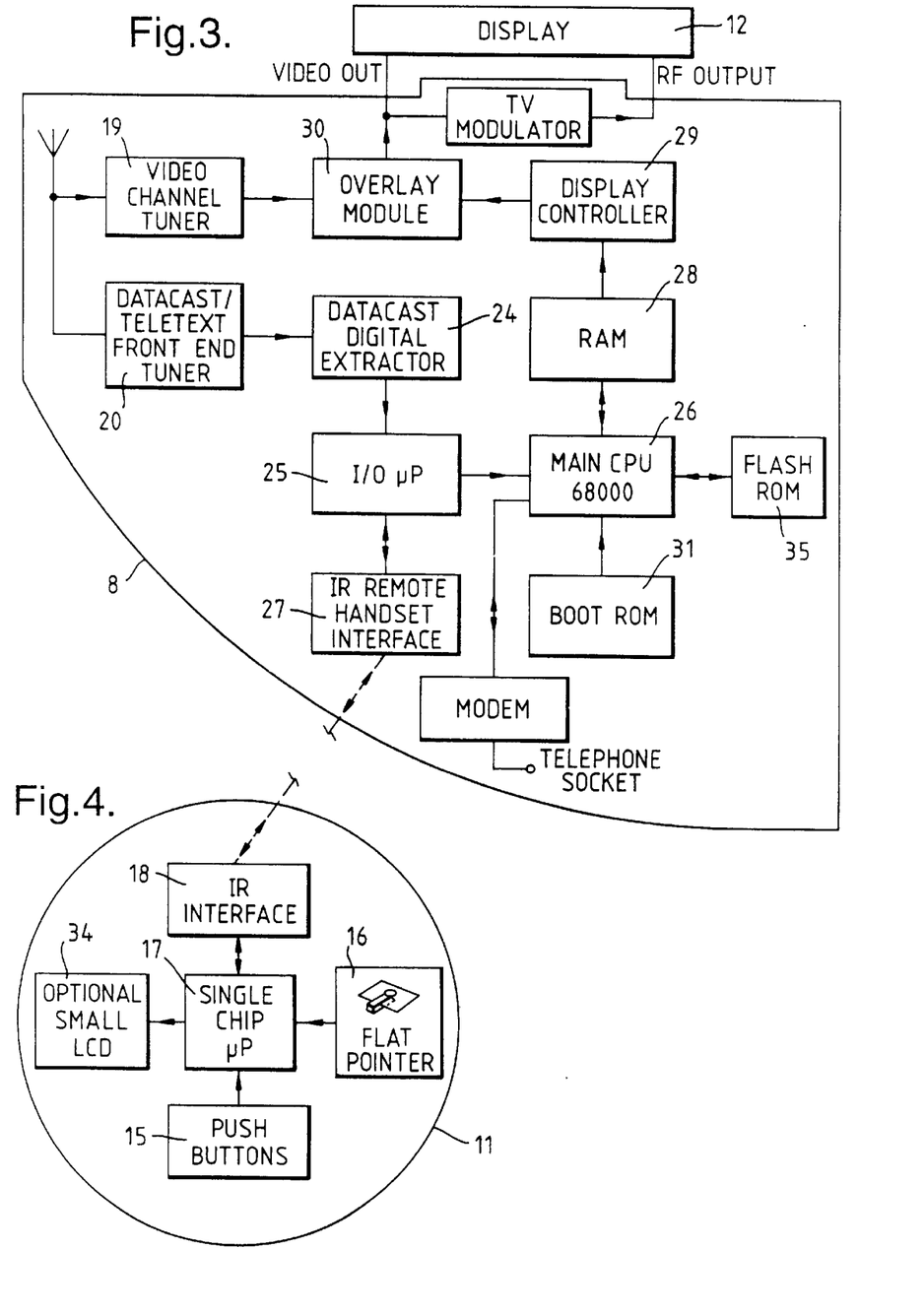
FIG. 3 is a block diagram of a local controller for use in the system of FIG. 1.
FIG. 4 is a block diagram of a handset for use in a system of FIG. 1.

The construction of the local controller 8 is shown in more detail in FIG. 3. As can be seen, the RF antenna 9 which receives data broadcast from the central controller is connected to a video channel tuner 19 and a datacast/teletext front end tuner 20 which separate the incoming broadcast signals into video and datacast/teletext signals respectively. The extracted video signals are fed to an overlay module 30 and are then output to the monitor 12 via the video out for display. Corresponding sound transmission is extracted by the TV modulator 33 and output via the RF output. In this way, a conventional broadcast television program can be viewed on the monitor 12.

Where the system is operating and is generating datacast or teletext signals for controlling operation of the local controller 8, these, having been separated from the incoming signal, are extracted by an extractor circuit 24 and fed to an I/O microprocessor 25 from where they are fed to a CPU or microprocessor 26.

The I/O microprocessor 25 is also connected to an infrared communicating device 27 for communicating with the remote handsets 11,21–23, output data from the communicating device 27 being fed via the I/O microprocessor 25 to the microprocessor 26, for example a 68000 processor. Data received from the handsets which is for controlling a cursor on the monitor 12 is stored in memory 28, typically conventional random access memory (static, dynamic, etc.) which can be multiplexed to provide access for both the local CPU 26 and display controller 29, or video RAM. (This memory also stores system data or games). This data is then fed by a display controller 29 of conventional form to the overlay module 30 where it is overlaid on the broadcast video from the tuner 19 before being output in a combined form on the monitor 12.

The local controller 8 is powered by mains voltage or household voltage. Once installed, the system is not switched off, but the screen display is no longer visible after a particular period of non-use. The operating system software is stored in the flash ROM 35, and when the handset is used again, the software is able to respond immediately. Also, if the system has been unplugged, it is the software from this memory 35 which will be ready to operate when plugged in again. A read only memory 31 stores a boot-up program for initializing the microprocessor 26. This is generally only when first manufactured or if the code is corrupted for some reason. The software code for the system is structured in multiple levels. In one example, these are BIOS, operating system, graphics kernel, windowing system, interpreter and applications programs. Any type of application can be run by down-loading alternative operating systems and programs from the central controller 1. Programs for operating the microprocessor 26 are stored in the memory 28 and can be updated or changed by downloading suitable data from the central controller 1 to the aerial 9 etc. This may occur, for example, at the beginning of a broadcast game show or separately during manufacture or by the owner loading the program himself. In any event, at the commencement of the broadcast program, the local controller microprocessor 26 is caused to run the appropriate program. The advantage of preloading the program is that only small bursts of real time game data need to be transmitted thereafter which maximizes the use of the limited bandwidth available.

The microprocessor 26 is also connected to a modem 32 which in use is connected to a conventional telephone jack or socket for transmitting data in the manner to be described below.

A block diagram of the components of a typical handset 11 is shown in FIG. 4. The handset 11 comprises a single chip microprocessor 17 connected to an infrared interface circuit 18 which receives and generates infrared signals so as to receive data from and transmit data to the IR communication device 27 of the local controller 8. A cursor control 16, to be described in more detail below, is connected to the microprocessor 17 as is a conventional key pad formed by a set of push buttons indicated at 15. The cursor 14 on the display may be controlled using keys on the key pad as an alternative to the cursor control 16 described. Optionally, an LCD display 34 may be provided for displaying text and graphics relating to a game.

Figure 5:
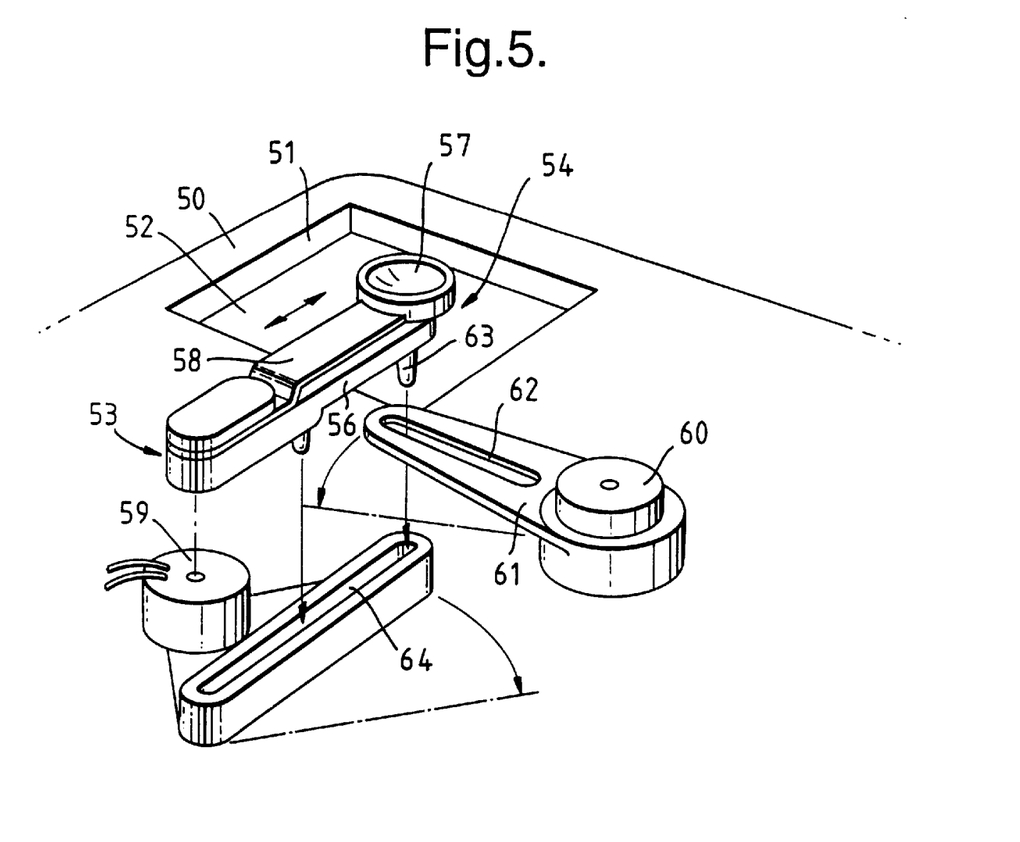
FIG. 5 is a plan view of the cursor of FIG. 5.

An example of the construction of the cursor control is shown in FIG. 5. The cursor control includes a housing 50 forming part of the handset, the remainder of which is not shown, the housing 50 including a rectangular frame 51 having a base 52 and a cursor arm mounting arrangement 53 on which a cursor arm assembly 54 is mounted. The assembly 54 includes a stylus member having an elongated leg 56 on the end of which is mounted a cursor control puck 57, coupled by an electrically conducting arm 58, to a horizontally mounted potentiometer 59. A vertically mounted potentiometer 60 is provided with an arm 61 in which a slot 62 is formed. A pin 63 connected to the base of the cursor control puck 57 is free to move in contact with the arm 61 in the slot 62. Rotation of the respective arms of the potentiometers causes an alteration in potential difference which is converted to position indication information for transmission to the local controller 8. The local controller then causes the cursor 14 on the display screen to move.

The base 52 within the frame 51 may be provided with graphics information, such as a grid, to enable the user to position the cursor assembly accurately.

As the cursor assembly 54 is moved relative to the housing 50 by the user moving the cursor control puck 57 laterally across the base 52, this movement is tracked by an equivalent movement of the pin 63 within the slots 62 and 64. The microprocessor 26 processes the voltage sensed by each potentiometer and converts it to a suitable signal for controlling the position of the cursor 14 on the display 12.

In operation, the IR communication system 27 polls each of the handsets 11,21–23 in turn. The microprocessor 26 causes the system 27 to turn an infrared source (not shown) off and on so as to generate an information carrying signal which is detected by each of the IR interface circuits 18 of the handsets 11,21–23. Direct switching is preferable to increase the transmissible data rate without the need for a more complex receiving circuit in each handset which would be required in order to decode a higher data rate encoded on a carrier. The pulsed signal is interpreted as a binary code which can be decoded by the microprocessor 17 and data transmitted in parallel. As an alternative, an infrared carrier could be modulated.

Interference between the infrared data stream from the handset or local controller, with conventional remote control units such as TV controllers, is avoided by not encoding the data-stream on a carrier in the conventional manner. This also ensures that the local controller does not react to a command from a conventional TV remote control unit.

Each handset is given a unique identifier. This can be embedded at the time of manufacture, entered by the user or distributed by the local controller to each handset in turn when the unit is first switched on. The poll signal consists of two information fields, a) the handset unique identifier and b) an acknowledgement field which indicates that the received data from the specified handset on the previous poll of that handset was received correctly.

In a preferred implementation, an acknowledgement bit is toggled by the local controller 8 on a correct reception so that the sending handset 11 can tell whether the data was received intact rather than simply missed due to an intermittent obstruction of the data stream, e.g. a chair leg in the way.

If a handset having a polled identifier is present, i.e. not switched off or out of range, it responds to the polling signal if it has data to send due to a change in status since the last time it was polled, or because the last data transfer of information attempted has not been correctly acknowledged. If there is no data to send, the handset does not respond and the central controller polls the next handset in line in accordance with its predetermined sequence. When all the handsets 11,21–23 have been polled, the local controller 8 begins again with the first one. It will be noted that each handset 11,21–23 only transmits data to the local controller 8 if that data has changed from the previous transmission. This conserves power.

The type of data transmitted by the handset can include cursor assembly position information (the X,Y data from the cursor control 16) which is used by the local controller 8 to adjust the position of a displayed cursor 14, and/or data from the key pad 15.

The length of data packets transmitted may be varied to allow different types of data to pass between the handset 11 and the local controller 8, e.g. button pushes, joystick (if one is provided) or track ball movements etc. Further, the handsets may optionally resynchronize to the data-stream by ensuring that the local controller waits a set time before it polls the next handset after it has received data or timed out while waiting for data from the current handset. Data such as requests for scores, position or control instructions can be sent in the reverse direction as additional information in each poll sent out by the local controller. The handset optionally implements a toggled acknowledgement bit in response to a data poll in order to implement a secure link in the reverse direction.

In the context of a game, in one example, the central controller 1 would broadcast a game show and viewers who have a local controller 8 and handsets can play the game.

Such a game might require the answering of questions by entering numbers on the key pad 15 and/or selecting options displayed on the monitor 12 by suitably positioning the cursor 14 and then pressing an enter button (not shown) on the key pad 15. In any event, this information is stored initially in the single chip microprocessor 17 and, when the handset is polled, transferred to the local controller 8 where it is again stored in the memory 28. In the case of a cursor selection, the data from the handset 11 will cause suitable data to be stored in the video RAM 28 which is used to reposition the cursor on the display so that the user can see where he has positioned the cursor prior to pressing the enter button.

If the central controller 1 is to broadcast the correct answer to a question, then an operator at the central location can use a game terminal 5 to generate a lock-out signal which is broadcast by the central controller 1, each local controller 8 responding to receipt of the lock-out signal to prevent any further data being received from the handsets. This prevents a player entering the correct answer after he has viewed it on the monitor.

In some games, a score is allocated to a correct answer and this can be achieved by using a suitable program to control operation of the microprocessor 26, or score information could be broadcast from the central controller 1. In any event, the local controller 8 will build up a record of scores from each handset 11 and store this for future use.

At the end of the game, the central controller 1 will control the return of game scores to it. For example, in order to reduce the amount of communication needed between each local controller 8 and the central controller 1, the central controller 1 could broadcast a score value, the microprocessor 26 in each local controller 8 responding to the received score value by comparing that score value with each stored score and only providing information about scores if they exceed the received score value. If they hold a score value exceeding the received score value then the microprocessor 26 causes the central controller 1 to be contacted via the PTN using the modem 32 and in response to suitable control instructions from the central controller 1, transmits the score together with the unique identifier of the handset in question.

The local controller 8 stores data relating to a score obtained by a particular user and at the end of a game, the score may be transmitted to the central controller 1 if certain predefined conditions are satisfied, i.e. if the player has got a sufficiently high score which he wishes to register. Scoring information may be transmitted to the central controller 1 by a direct telecommunication link or via a data network. Communication with the central controller 1 could equally be via a cable TV connection having two-way operation. The necessary score may be announced on the game show or automatically displayed on the display screen 12. The local controller 8 may be adapted to automatically transmit the score if it exceeds a threshold value or it may require the user to activate the transfer himself such as by pushing a button on the handset to select a displayed function.

There are various ways in which the scores of the game can be transferred in a timely and cost effective manner to the central controller 1. An analysis of two methods to optimize the transmission of game scores is set out below. These methods are improvements on that described in an earlier published application number WO91/08810.

In the system of the present invention when used for game playing, there may be a large number of users playing interactive TV games from their homes and at the end of a game, the central controller must determine which users have scored well enough in that game to win prizes. Transmissions may be sent from the central controller to users' homes to instruct the users' hardware, under certain circumstances, to send the users' score data to the central controller via a modem link (or other means of transmission). Under optimal circumstances, the winners of a game may be determined quickly (within a few minutes) and with a minimal number of telephone calls being made via users' modems.

The method proposed in WO 91/08810 for determining which user scores should be transmitted to the central controller at the end of a game claims, under certain circumstances, to allow the central controller to determine the top 100 scores by initiating only 790 telephone calls from a population of 100,000 units.

However, the assumptions made appear to be inappropriate since there would be a prohibitive time overhead in employing the method of WO 91/08810.

The prior art method assumes ". . . that the units are selected one at a time completely random of their score . . . ". While it is true that if the units are selected for testing one at a time, the expected number of telephone calls (790 from a population of 100,000 users) is very low, it is only possible to select the units one at a time if there is sufficient time to test all units sequentially. A reasonable assumption is that it will take approximately 20 seconds to select a unit, to transmit the unit's code number and have it received by the unit, to have the unit dial the central controller (if that unit's score is high enough to require transmission) and finally to have the unit send its score(s) to the central controller, then the estimated time required to do this with only 790 units is 263 minutes, against a target completion time for the task of 3–4 minutes.

In fact, the problem is orders of magnitude larger than this because each of the 790 units tested can be instructed to transmit its score only when it is known that all previous units have either transmitted their own scores or do not need to do so because their scores are not high enough. The central controller cannot assume that a unit's score is not high enough for transmission until the time set aside for that unit to call the central controller has expired without any such call having been made. Thus, there would be insufficient time for the sequential selection and testing of 790 units.

Within the group of participating users, a predetermined number are to be designated as winners. Rather than test every score sequentially, the user's units are allocated to groups with each successive group intended to have more users than the previous group and with each selected unit within a group calling the central controller at or as close to the same moment in time as the number of telephone lines available for score transmission permits. A selection condition for including a particular unit in a group is that the particular unit's score(s) must be at least as high as that of the lowest current "leading winner". A leading winner is a player whose score has been transmitted and is currently in the leading group of scores and would be a winner if no further scores were transmitted. The two extreme cases within this method are:

(i) Each group consists of 1 unit in which case the number of calls expected is optimal.

(ii) There is only one group, consisting of the entire population, in which case every one of the units must call the central controller.

Clearly, the larger the number of groups selected the closer it is possible to get to optimality. Even with a relatively small number of groups, the number of calls required is far closer to the optimal figure than it is to the worst case. Consider the following analysis in which 4 successive groups of 100, 1000, 10000 and 88900 (totalling 100000) are tested.

a) First select 100 units since the example requires there to be 100 winners.

b) The probability that the 101st unit selected will have a score higher than that of at least one of the already selected top 100 scores is 100/101, so the expected number of calls to be made from the next group (1000 units) will be:

1000×(100/101)=990 calls c) The probability that the 1101st unit selected will have a score higher than that of at least one of the already selected top 100 scores is 100/1101, so the expected number of calls to be made from the next group (10000 units) will be:

10000×(100/1101)=908 calls d) The probability that the 11101th unit selected will have a score higher than that of at least one of the already selected top 100 scores is 100/11101, so the expected number of calls to be made from the final group (88900 units) will be:

88900×(100/11101)=801 calls

From the results of a), b), c) and d), it can be seen that the total number of calls required has been: 100+990+908+801=2,799, compared to the 790 expected by the method described in WO91/08810.

It is possible that the total of 2,799 for 4 groups could be improved on by altering the number of units within each group. For example, rather than have groups b), c) and d) increase in size by a factor of 9 or 10, it may provide a lower total number of calls if there is no attempt to make the ratio between the size of groups b), c) and d) constant.

The number of groups will depend partly upon the total elapsed time allowed for testing. Given a target of 3–4 minutes, this allows for 9–12 groups. The following analysis illustrates the magnitude of improvement to be expected when increasing the number of groups from 4 to 9. Using group sizes of 100, 400, 800, 1600, 3200, 6400, 12800, 25600 and 49100 (total 100000).

a) As before, the first group consists of 100 units as there must be 100 winners.

b) The probability that the 101st unit selected will have a score higher than that of at least one of the already selected top 100 scores is 100/101, so the expected number of calls to be made from the next group (400 units) will be:

400×(100/101)=396 calls c) The probability that the 501st unit selected will have a score higher than that of at least one of the already selected top 100 scores is 100/501, so the expected number of calls to be made from the next group (800 units) will be:

800×(100/501)=160 calls d) The probability that the 1301st unit selected will have a score higher than that of at least one of the already selected top 100 scores is 100/1301, so the expected number of calls to be made from the next group (1600 units) will be:

1600×(100/1301)=123 calls e) The probability that the 2901st unit selected will have a score higher than that of at least one of the already selected top 100 scores is 100/2901, so the expected number of calls to be made from the next group (3200 units) will be:

3200×(100/2901)=110 calls f) The probability that the 6101st unit selected will have a score higher than that of at least one of the already selected top 100 scores is 100/6101, so the expected number of calls to be made from the next group (6400 units) will be:

6400×(100/6101)=105 calls g) The probability that the 12501st unit selected will have a score higher than that of at least one of the already selected top 100 scores is 100/1251, so the expected number of calls to be made from the next group (12800 units) will be:

12800×(100/12501)102 calls h) The probability that the 25301st unit selected will have a score higher than that of at least one of the already selected top 100 scores is 100/25301, so the expected number of calls to be made from the next group (25600 units) will be:

25600×(100/25301)≦101 calls i) The probability that the 50901st unit selected will have a score higher than that of at least one of the already selected top 100 scores is 100/50901, so the expected number of calls to be made from the next group (49100 units) will be:

49100×(100/50901)=96 calls

From the results of a), b), c) . . . and i), it can be seen that the total expected number of calls required has been: 100+396+160+123+110+105+102+101+96=1,293 compared to 2,799 when using only 4 groups rather than 9 and compared to the 790 expected by the method described in WO91/08810.

An initial assumption is that when testing starts at the end of a game, every home which has a unit may be playing that game. The sizes of the groups into which the total population should be split will be chosen accordingly, in such a way that the total number of groups will not be the cause of the system exceeding the target time for finding the winner(s).

The method described above assumes that the scores are randomly distributed with respect to the order in which they are examined.

In the worst case, if scores were always examined in ascending order of magnitude, every unit would need to call the central controller to report its result because at the moment of testing the score for a unit, that score would always be greater than that of all the scores examined thus far. The probability of this worst case arising is virtually nil; nevertheless, it should be recognized that on some occasions the number of calls made will be considerably in excess of the expected number. The extent of this problem can be determined and in order to compensate for the problem, the times at which calls are made to the central controller can be staggered in order to avoid overloading the telephone network.

In the best case, the winners' scores would all be in the first group tested, whereupon no further telephone calls would be required. Clearly an improvement on randomness as a means of selecting the units in the first group will reduce the total number of calls required.

It is reasonable to assume that units which had previously transmitted high scores for a particular game would be more likely than randomly chosen units to transmit high scores on subsequent occasions when that game was played. Since the central controller will be keeping a log of all scores transmitted, we should take advantage of this data. The central controller could maintain a ranking order for each unit for which a score had previously been transmitted in relation to a particular game, and the first group to be tested for a subsequent occurrence of the game would be chosen from the top of this ranking order.

Given that the proportion of previously ranked units participating on any particular occasion is not known, then to select, for example, 100 units for the first group, it might be necessary to instruct, for example, 200 units to call the central controller, assuming that only half the ranked units were participating. The exact algorithm to be used for determining the number of units in the first group can be determined from a consideration of playing frequency patterns. Initially, it is necessary to make an intelligent guess.

A statistical approach, consisting of collecting the scores for a number of randomly chosen units and plotting a curve of these scores against their frequency, could be used as the basis for a rating system in which every player could have a rating, reflecting their performance in a particular TV program as well as their cumulative performance over several programs of the same game, or several programs of different games.

If it is decided to use a curve sampling method as described in WO91/08810, then clearly selection of the first 2,000 units must be at random if we wish to achieve an accuracy of 95%±2%. If the number of units selected is significantly different from 2000, this accuracy would change. In this case, the highest scorers from previous programs of this game would be tested as with the first part of the same group as that containing the randomly chosen 2,000, and the top score(s) of the entire group would then be used as the minimum score for selection within the next group. This would have some advantage in allowing the test procedure to home in on the highest scores with fewer calls from the second and subsequent groups tested, but the cost would be the increased number of calls incurred from the 2,000 randomly chosen units within the first group tested.

A different method is described below.

The range of possible scores is divided into a number of score groups and, starting with the highest score group, users' hardware are instructed to transmit the data for all users whose scores lie within a particular group. This method has the advantage that the winner's score will be found very early in the score transmission process.

The assumption is made that the scores lie in the range 0–1,000 and that the number of telephone lines is at least as great as the number of winners required. It is sensible to create the score groups in such a way as to avoid having a large number of users with scores in the top group(s), hence a suitable division into score groups might be:

|         |                 |            |
|---------|-----------------|------------|
| Group 1 | score = 1,000   | (1 score)  |
| Group 2 | score = 998–999 | (2 scores) |
| Group 3 | score = 994–997 | (4 scores) |
| Group 4 | score = 986–993 | (8 scores) |
| Group 10| score = 0–489   |            |

The first iteration requires all users (if any) with scores of 1,000 to transmit their scores. There should be a short delay after this instruction is transmitted before the next score group is accessed, otherwise a difference in dial-up and connect times could cause at least some users from Group 2 to have their scores transmitted before those from Group 1. A delay of 2–3 seconds should probably be sufficient.

At some stage during the process, a score group will be accessed which contains more users than the number required to complete the list of winners. There is no way of knowing which score group this will be until the total number of calls reaches the number of winners required. Typically, if the number of telephone lines in use is the same as the number of winners required, the central controller should be programmed to detect an "all lines busy" condition and then abort all instructions to access lower score groups—the score group for which the "all lines busy" condition first occurs is the lowest score group which needs to be accessed. This score group can be called the "lowest score group".

Once the "all lines busy" condition has been detected and acted upon, the remaining users who are winners and whose scores lie within the lowest score group must be identified. The scores of a number of winners and potential winners are already available, but there will almost certainly exist within the lowest score group some other users whose scores have:

a) not yet been transmitted; and,
b) are greater than or equal to those of some of the potential winners already identified.

The only users whose scores need to be investigated are those who lie within the lowest score group. There will, however, be some occasions when a very large number of users have scores within the lowest score group. One way to address this problem would be to instruct score transmission for the highest score within the group, then the next highest score, and so on, until all the winners have been identified. Again, the "all lines busy" condition could be used to determine the lowest score that can be achieved by a winner.

Even allowing for a delay of a couple of seconds or so between accesses to successively lower scores, and even when there are 100 or more scores within the lowest score group, it is unlikely that the delay in completing the process would be more than a few minutes.

This method appears to be both efficient in terms of identifying the overall winner and economical in the number of telephone calls required to identify all the winners (probably no worse than twice the number of winners).

As well as broadcast game playing uses, game playing where two or more players or teams of players at different remote locations wish to compete directly can be achieved. The central controller can simply act as a conduit or take a closer controlling role such as determining the pairings for the next round of a competition between players or teams, when results from each contest are sent to the central controller.

Although the examples given relate to a game playing system, the local controller and handsets may have other applications. For example, placing of bets for various sporting events where information is fed back from the viewers local handsets via the local controller to the central controller and then onto a third party to receive bets placed against a list of odds which have been broadcast together with or separate from other broadcast data.

Another use is for polling viewers during a mass broadcast program such as a news or current events program.

A further application relates to the advertisement of goods and services. For example, a broadcast advertisement can be displayed on the monitor 12 and by suitably using the cursor 14 and key pad 15, a viewer could request further information about the product or service advertised, the request being transmitted via the modem 32 to the central controller 1 where it is stored or passed on to the advertiser. In a particular example, if the viewer wishes to order a product such as a pizza, then the central controller generates a menu on the monitor 12 and the viewer uses the cursor 14 and keypad 15 to select a particular pizza from the menu. This request is fed back via the local controller and central controller to the pizza company. Similarly, clothes can be ordered from an on-screen catalogue and an order for the item to be delivered to a given address, to the address registered to the local controller or to be held for collection, can be transmitted from the user's local controller to that of the third party. Alternatively, the user can communicate with a shop assistant to discover what products they have and make enquiries, such as obtaining advice on accessories and color matches. The shop assistant will be able to respond via their own handset and local controller. The use of multiple handsets in the shop permits several staff to deal with questions simultaneously via one local controller.

What is claimed is:

1. An interactive telecommunication system for use in conjunction with a TV broadcast, the system comprising:
   a local controller operable to control data flow to and from at least two local handsets for generating data, the local controller including a memory for storing data and processing means;
   a central controller connectable to the local controller for generating data related to the TV broadcast; and
   a display local to the local controller for displaying the TV broadcast, said data from the central controller, and data from the local controller wherein the local controller stores data generated by each of the at least two local handsets and selectively transfers stored data to the central controller.

2. A system according to claim 1 wherein:
   the processing means of the local controller is adapted to address each of the at least two local handsets sequentially in accordance with a predetermined schedule to obtain data from each of the at least two handsets.

3. A system according to claim 2 wherein:
   the predetermined schedule requires each of the at least two handsets to be addressed for an equal time period.

4. A system according to claim 1 wherein:
   the local controller memory is adapted to store data supplied from the central controller.

5. A system according to claim 1 wherein:
   a unique identifier by which each of the at least two handsets is addressed is allocated during use of a handset within the system.

6. A system according to claim 1 wherein:
   the local controller and central controller are connectable via a telecommunication link.

7. A system according to claim 1 wherein:
   the central controller broadcasts video and text data for reception by the local controller and for display on the display.

8. A system according to claim 1 wherein:
   transfer of data between each of the at least two handsets and the local controller is via an infrared link.

9. A system according to claim 1 wherein:
   the processing means of the local controller selectively transfers data to the central controller only if a predetermined transfer condition is met.

10. A system according to claim 9 wherein:
    the predetermined transfer condition comprises exceeding a predetermined score value at the end of a game play period.

11. A system according to claim 1 wherein:
    the processing means of the local controller only transmits data to the central controller in response to a command from the central controller.

12. A system according to claim 11 wherein:
    the command is broadcast by the central controller along with video and text data.

13. A system according to claim 1 wherein:
    a second local controller operable to control data flow to and from respective second handsets is provided, such that data may be transferred between the first and second local controllers via the central controller.

14. A system according to claim 1 wherein:
    the system is selected from the group consisting of a game playing system, a purchase system, and an information system.

15. A handset for use in an interactive system according to claim 1, the handset comprising:
    a transmitter and a receiver for transfer of data from the local controller to the handset and from the handset to the local controller;
    input means to input data for controlling the output of the display via the local controller, the input means comprising a cursor control laterally movable over a plane, means for sensing the position of the cursor control within the plane and for causing a corresponding cursor displayed on the display to take up a similar position; and
    processing means for processing data from the local controller and data from the input means and wherein the processing means controls the transfer of data to the local controller in accordance with the data from the local controller and the input means.

16. A handset according to claim 15 wherein:
    the sensing means monitor a change in potential difference with a change in position of the cursor control.

17. A handset according to claim 15 wherein:
    the system is selected from the group consisting of a game playing system, a purchase system and an information system.

18. A method of operating an interactive system in conjunction with a TV broadcast, comprising the steps of:
    broadcasting first data from a central controller in conjunction with a TV broadcast whereby a local controller responds by causing a display to display the broadcast first data and the TV broadcast;
    storing second data in the local controller obtained from each of a number of local handsets relating to the first data; and
    selectively transferring the stored second data to the central controller if predetermined conditions are satisfied.

19. A method according to claim 18 wherein:
    the first data comprises game playing information and the second data comprises data relating to the playing of the game.

20. A method according to claim 19 wherein:
    the predetermined conditions are supplied to the local controller by the central controller as part of the game playing information broadcast.

21. A method according to claim 19 wherein:
    the predetermined conditions include a minimum score value, the local controller comparing each stored score with the minimum score value and only transferring a stored score to the central controller if the stored score is the same as or exceeds the minimum score value.

22. A method according to claim 19 wherein:

the central controller maintains a ranking order for units which have previously recorded scores and defines an upper portion of the ranking order from which units are chosen to transmit their scores.

23. A method according to claim 19 wherein:

the central controller allows a first group of scores to be transmitted, then sets one or more further group sizes until the desired number of scores which comply with the predetermined condition is achieved.

24. An interactive system for use in conjunction with a TV broadcast and transmitting data between different locations comprising:

a local controller;

a plurality of handsets coupled to said local controller;

a memory device associated with said local controller, said memory device capable of storing data received from each of said plurality of handsets;

a central controller for generating data related to the TV broadcast, said central controller selectively linked to said local controller and capable of receiving the data from said local controller at a predetermined time;

a display coupled to said local controller for displaying the TV broadcast, said data from the central controller and data from the local controller; and a data distribution network coupled to said central controller, said data distribution network broadcasting signals to said local controller, whereby said local controller receives information broadcast by said data distribution network permitting a user to respond thereto, a user response being stored for subsequent transfer to said central controller at the predetermined time.

25. An interactive system for transmitting data relating to a TV broadcast between different locations comprising:

a local controller;

a plurality of handsets coupled to said local controller, each of said plurality of handsets having a unique identifier, said plurality of handsets sequentially sending data, including the unique identifier, to said local controller when requested by said local controller;

a memory device associated with said local controller, said memory device capable of storing the data, including the unique identifier, sent by each of said plurality of handsets;

a cursor control associated with each of said plurality of handsets, said cursor control controlling the position of a cursor displayed on said display;

a central controller for generating data related to the TV broadcast, said central controller selectively linked to said local controller and capable of receiving the data, including the unique identifier, from said local controller at a predetermined time;

a display coupled to said local controller for displaying said data from the central controller and the local controller; and a data distribution network coupled to said central controller, said data distribution network broadcasting TV signals to said receiving antenna of said local controller, the TV signals including a signal representative of a predetermined transfer condition, whereby said local controller receives information broadcast by said data distribution network permitting a user to respond thereto, a user response being stored by said memory device for subsequent transfer to said central controller at the predetermined time conditioned upon meeting the predetermined transfer condition.

* * * * *